United States Patent [19]

Luria

[11] 4,033,304

[45] July 5, 1977

[54] PISTON-TYPE INTERNAL COMBUSTION ENGINE

[76] Inventor: David Luria, 11 Pelechovsky St., Tel-Aviv, Israel

[22] Filed: June 10, 1975

[21] Appl. No.: 585,652

[30] Foreign Application Priority Data

June 14, 1974 Israel .................................... 45039
Apr. 8, 1975 Israel .................................... 47050
Apr. 8, 1975 Israel .................................... 47051

[52] U.S. Cl. .......................... 123/78 A; 123/48 A; 123/75 E; 123/90.12; 123/90.15; 123/105
[51] Int. Cl.² ..................... F02B 75/04; F01L 1/34
[58] Field of Search ............ 123/48 R, 48 A, 48 D, 123/75 E, 78 R, 78 A, 78 D, 90.12, 90.15, 90.16, 90.32, 105

[56] References Cited

UNITED STATES PATENTS

| 741,824 | 10/1903 | Pehrsson | 123/48 A |
|---|---|---|---|
| 1,307,185 | 6/1919 | Claudel | 123/75 E |
| 1,437,929 | 12/1922 | Brockway | 123/48 A |
| 1,497,206 | 6/1924 | Booton | 123/75 E |
| 1,819,897 | 8/1931 | Johnson | 123/78 A |
| 2,332,280 | 10/1943 | Udale | 123/90.16 |
| 2,393,749 | 1/1946 | Cadella | 123/78 A |
| 3,369,532 | 2/1968 | McIlroy | 123/90.16 |

*Primary Examiner*—C. J. Husar
*Assistant Examiner*—David D. Reynolds
*Attorney, Agent, or Firm*—Benjamin J. Barish

[57] ABSTRACT

A piston-type internal combustion engine includes a variable valve timing device controlling the timing of the intake valve, and a coupling between the accelerator pedal and the variable timing device for varying the timing of the intake valve in response to the movement of the accelerator pedal, thereby controlling the quantity of the fuel mixture in the cylinder at the time of combustion. The engine also includes means for maintaining a substantially constant compression ratio in the cylinder notwithstanding variations in the engine output.

A number of embodiments are disclosed. In one embodiment, the means for maintaining a substantially constant compression ratio in the cylinder comprises an auxiliary cylinder and an auxiliary piston movable therein, the inner end of the main and auxiliary pistons communicating with each other and defining a common chamber with their respective pistons, the auxiliary piston being displaceable within its cylinder to enlarge or decrease the volume of the common chamber.

20 Claims, 18 Drawing Figures

| STROKE | EXPANSION | EXHAUST | INDUCTION | COMPRESSION |
|---|---|---|---|---|
| CRANK ANGLE (deg) | 180 | 360 | 540 | 720 |
| HIGH OUTPUT | | | | |
| INTAKE VALVE OPENING | — | — | 360–540 | — |
| LOW OUTPUT | | | | |
| INTAKE VALVE OPENING | — | — | 360–540 | 540–640 |

FIG.9

PISTON-TYPE INTERNAL COMBUSTION ENGINE

BACKGROUND OF THE INVENTION

The present invention relates to internal combustion engines, and particularly to the piston-type internal combustion engine including a cylinder and a piston movable therein through induction, compression, expansion and exhaust strokes.

Commonly used today in automobiles is the conventional four-stroke Otto-cycle engine, the engine output usually being varied by means of a throttle which controls the amount of fuel mixture inducted into the engine. One drawback of such an engine is that the Otto-cycle, in which the induction and compression strokes are equal to the expansion and exhaust strokes, does not enable as complete combustion and exhaust of the combustion gases, as, for example, the Atkinson-cycle engine. The latter uses longer strokes for expansion and exhaust than for induction and compression, and thereby obtains more complete expansion and exhaust. The Otto-cycle engine is therefore not as efficient as the Atkinson-cycle engine. Another disadvantage of the conventional Otto-cycle engine is that the throttle, when partially or completely closed to lower the engine output, causes pumping losses and thereby further reduces engine efficiency. A further disadvantage is that the incomplete combustion of the fuel causes serious air-pollution problems.

SUMMARY OF THE INVENTION

An object of the present invention is to provide an internal combustion engine having improved performance characteristics in the above respects.

According to the present invention, the internal combustion engine comprises a main cylinder and a main piston movable therein; an auxiliary cylinder and an auxillary piston movable therein; the inner ends of the two cylinders being in communication with each other and defining a common chamber with their respective pistons; means including a fuel intake valve for effecting the induction of a fuel-air mixture into said common chamber; a control member movable to control the engine output; a variable valve timing device controlling the timing of the intake valve; a coupling between said movable control member and the variable valve timing device effecting a delay in the closing of the intake valve in response to the movement of the control member, which delay is increased when the control member is moved to lower the engine output and decreased when the control member is moved to raise the engine output; said auxillary piston being floatingly displaceable in its auxiliary cylinder to increase or decrease the volume of the common chamber; a spring urging the auxiliary piston to its innermost position within the auxillary cylinder; and limiting means controlled by said control member and acting on said auxillary piston independently of said spring for limiting the outermost position of the auxillary piston within its auxillary cylinder to increase or decrease the volume of said common chamber is accordance with the engine output so as to provide a substantially constant compression ratio and substantially complete exhaust during all loads.

According to a further feature, the engine includes a throttless intake manifold so that there is substantially atmospheric pressure within the cylinders during the time the intake valve is open, and during the exhaust stroke, thereby minimising pumping losses.

It will thus be seen that an engine constructed in accordance with the foregoing features obviates the need of a throttle to vary the engine output. When such an engine is included in an automobile, the accelerator pedal (the movable control member controlling the engine output) varies the engine output by controlling the delay in the closing of the intake valve. Such an engine therefore does not have the pumping losses present in an engine including a throttle for controlling engine output. While not needed for normal engine control, a throttle may be included, for example for purposes of braking.

As will be described below, for partial loads such a construction produces longer expansion and exhaust strokes than the real induction and compression strokes. Thus, the operation is according to the Ideal Otto cycle only for the maximum load conditions. The cycle of the novel engine will therefore be referred to as an "Otto-Atkinson cycle", and as will be shown below, it is capable of producing more complete expansion and exhaust and better efficiency than the conventional Otto cycle engine for under maximum load conditions.

A number of embodiments of the aspect of the invention are described. In one embodiment, the engine includes a hydraulic system controlling the displacement of the auxiliary piston towards the outer end of its auxiliary cylinder. More particularly, the hydraulic system comprises: a hydraulic chamber, a fluid inlet line connected to the inlet of the hydraulic chamber, a fluid outlet line connected to the outlet of the hydraulic chamber, and hydraulic fluid control means controlling the flow of the hydraulic fluid through said outlet line.

Further embodiments of the invention are described wherein the engine includes a cam coupled to the engine-output control member for controlling the displacement of the auxiliary piston outwardly in its auxiliary cylinder to maintain the substantially constant compression ratio not-withstanding variations in the engine output.

According to a further aspect of the invention, the engine also includes a fuel injector pump and a connection from same to the auxiliary piston such that the outward displacement of the auxiliary piston during the compression stroke effects the injection of fuel into the respective common chamber.

According to another aspect of the invention, the intake valve is opened by a cam on the cam shaft and is closed by a return spring, the variable timing device comprising a hydraulic device acting against the return spring for retarding the closing of the intake valve in accordance with the movement of the engine-output control member.

An internal combustion engine constructed in accordance with the latter features provides a number of important advantages: Thus, it enables the use of a more conventional piston and intake-valve construction. Further, it enables the engine to be operated with an enlarge volume combustion chamber for anti-pollution purposes. In addition, it provides an automatic fuel injection arrangement.

According to another described embodiment, an arrangement for further improving the dynamic performance of the engine is provided, this arrangement including hydraulic means for augmenting the displacement of the auxiliary piston during the compression stroke.

According to a still further feature, the hydraulic means is controlled by the engine-output control member to provide a higher degree of augmentation during high engine speed than during low engine speed.

More particularly, the hydraulic means comprises an oil pump driven by a cam on the engine cam shaft, the cam driving a follower whose position with respect to the cam is varied by the engine-output control member.

According to another described feature, the engine further includes a brake control system which, when actuated, prevents the rise of the auxiliary piston during the compression stroke, and enables its rise during the expansion stroke.

BRIEF DESCRIPTION OF THE DRAWINGS

The invention is herein described, for purposes of example only, with reference to the accompanying drawings, wherein:

FIGS. 8 and 9 are diagrams helpful in explaining the operation of the engine of FIG. 7.

DESCRIPTION OF THE PREFERRED EMBODIMENTS

FIGS. 1–8 EMBODIMENT

Figure 7:
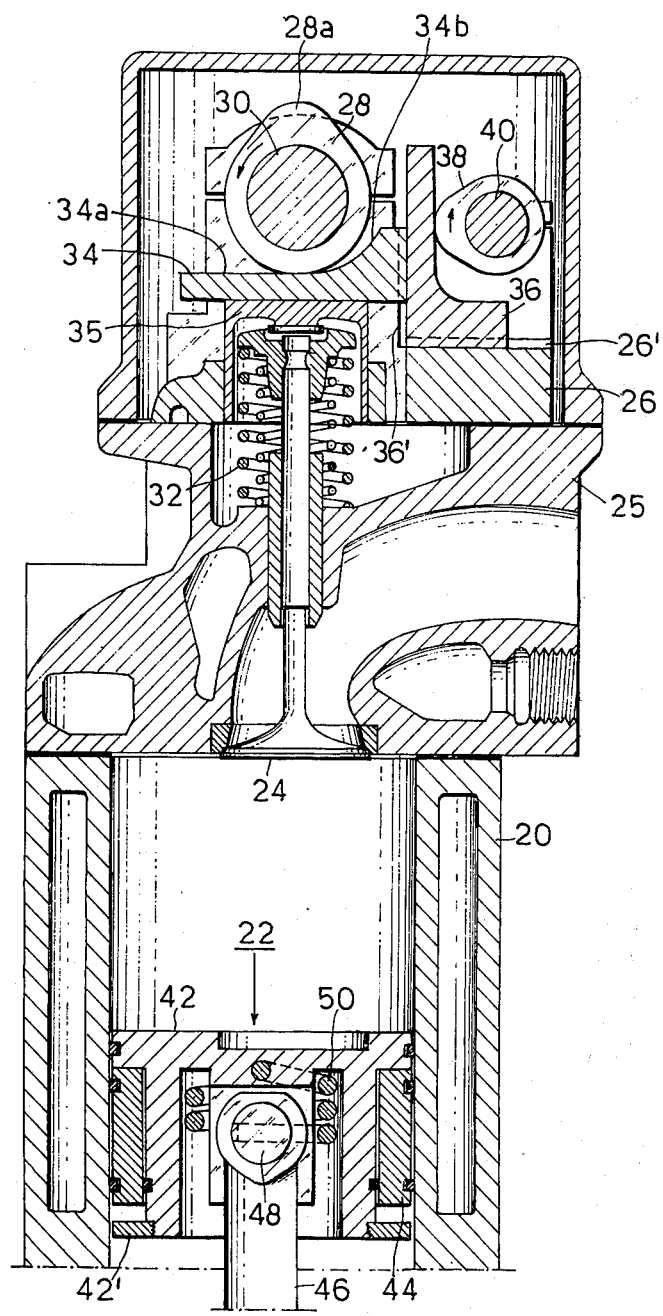
FIG. 7 is a transverse sectional view illustrating an "Otto-Atkinson" engine constructed in accordance with the invention.

Before describing the preferred embodiment of the invention illustrated in FIG. 7, it will be helpful in understanding the invention to first discuss some thermodynamic considerations on which the invention is based.

Figure 1:
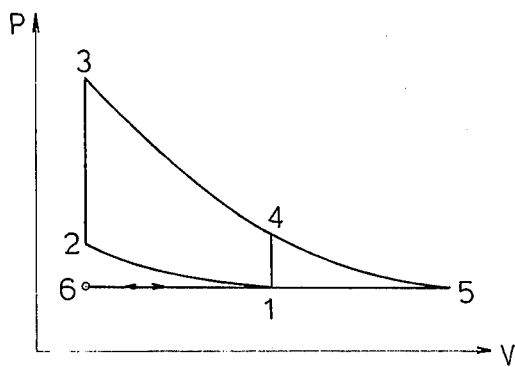
FIG. 1 is a pressure-volume diagram illustrating both the ideal Otto and Atkinson cycles.

FIG. 1 illustrates the ideal Otto and Atkinson cycles, the Otto cycle including a path 6-1-2-3-4-1-6, and the Atkinson cycle including the path 6-1-2-3-4-5-6. As known, the Atkinson cycle the expansion and the exhaust strokes are both longer than the induction and compression strokes, which produces a more complete expansion, and therefore a more efficient operation, than in the ideal Otto cycle.

In both the Otto-cycle and Atkinson-cycle engines, an increase in the compression ratio increases the ideal thermal efficiency of the engine. This is shown by curves A and B, respectively, in FIG. 2.

Figure 3:
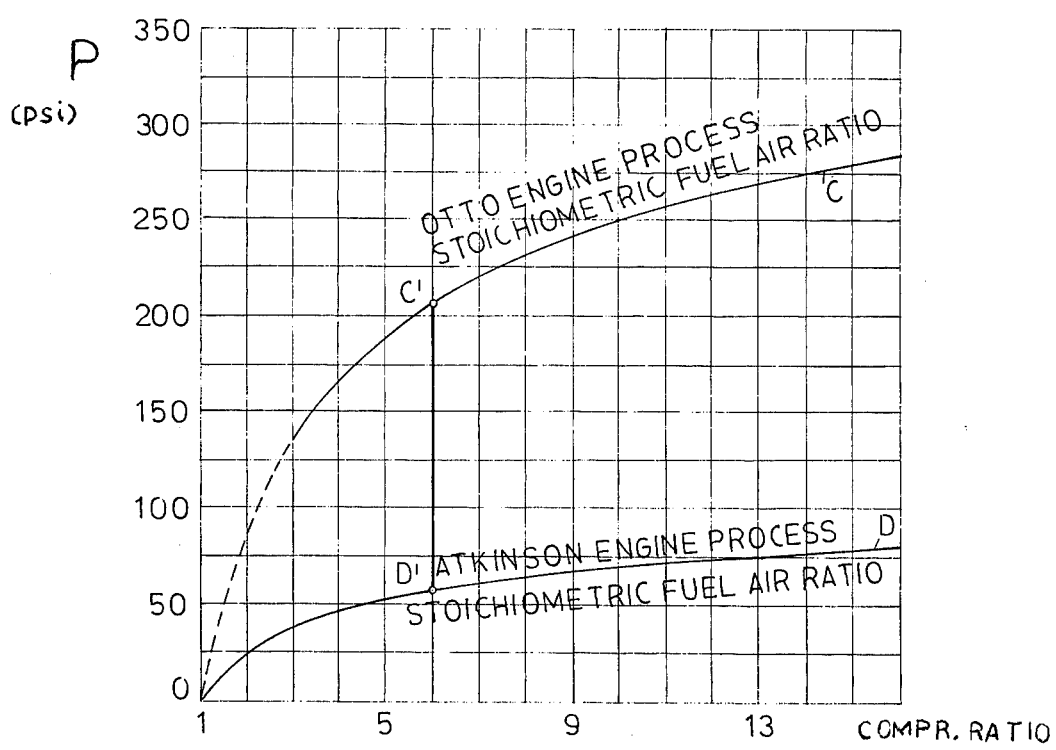

As will be noted from FIG. 3, the ideal mean effective pressure (IMEP) also varies with the compression ratio in both the Otto-cycle and Atkinson-cycle engines, this being shown by curves C and D, respectively. The Atkinson-cycle engine, since it involves a longer expansion stroke as compared to the Otto-cycle engine, results in a very low IMEP value.

Figure 4:
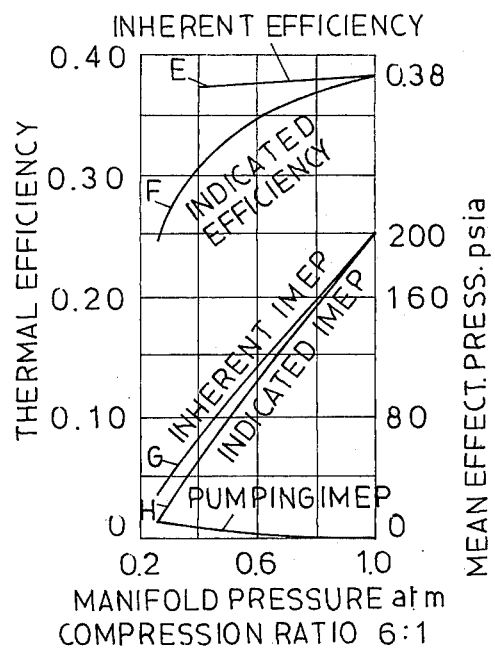
FIG. 4 illustrates how the thermal efficiency is affected by throttling an Otto-cycle engine.

FIG. 4 illustrates the affect of throttling on the ideal Otto-cycle engine, this figure showing the condition at a compression ratio of 6:1. Thus, when the manifold pressure is 1.0 atm (i.e. a fully open throttle to produce maximum engine output), the inherent efficiency of the engine is about 38% as shown by curve E; and as the throttle is closed, this inherent efficiency decreases. The indicated efficiency, shown by curve F, decreases even faster, so that when the manifold pressure is approximately 0.3 atm, the indicated efficiency drops because of the pumping work required when the throttle is almost closed.

Curves G and H in FIG. 4 illustrate how the inherent IMEP and the indicated IMEP, respectively, vary with variations in the manifold pressure caused by throttling the engine. It will be seen that these decrease rapidly from a mean effective pressure of about 200 psia at fully open throttle (1 atm) to about 40 psia at a manifold pressure of 0.3 atm (compression ratio =6:1).

In the present invention, the engine output is not varied by a throttle, but rather by controlling the timing of the intake valve in response to the movement of the engine output control member (e.g. automobile accelerator pedal) to control the quantity of the charge inducted into the engine. In the described embodiment, this is effected by providing a variable timing device coupled to the engine-output control member to effect a delay in the closing of the intake valve after the start of the compression stroke, such delay being increased when the control member is moved to lower the engine output, and being decreased when the control member is moved to raise the engine output. Thus, the greater the delay in the time of closing of the intake valve, the greater will be the quantity of the mixture which will be foreced back into the intake manifold, and therefore the smaller with be the charge actually inducted into the cylinder at the time of the actual closing of the valve. The smaller charge will therefore produce a lower engine output.

According to a further feature of the invention, the engine operation approximates a substantially constant compression ratio operation notwithstanding the variations in the delay of closing the intake valve. This is effected in the embodiment of FIG. 7, by providing the piston with a floating crown such that the lowering of the gas pressure acting thereon upon an increase in the delay of closing the intake valve permits the crown, by virtue of the inertia force acting on it, to move further inwardly into the cylinder at the end of the compression stroke than when the delay is decreased. In the preferred embodiment described below, the crown is floated by means of a spring, and therefore a spring force acts with the inertia force to move the crown further inwardly into the cylinder at the end of the compression stroke.

Figure 2:
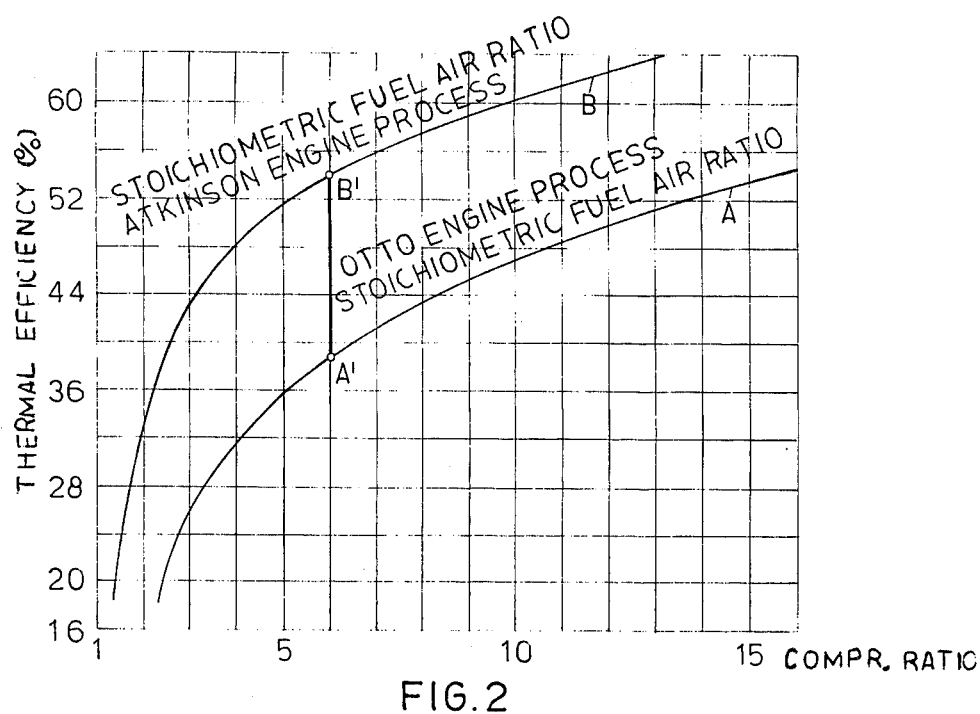
FIGS. 2 and 3 are diagrams illustrating respectively, how the indicated thermal efficiency and the mean effective pressure vary with the compression ratio in both the Otto-cycle abd the Atkinson-cycle engines.

Thus, the operation of the Otto-Atkinson engine illustrated in FIG. 7 as a preferred embodiment of the invention approximates the constant compression ratio line A' – B' of FIG. 2, and C' –D' of FIG. 3, these lines illustrating the operation at a compression ratio of 6:1 for reducing the engine output. Point A' corresponds to the maximum load achieved by Ott-Atkinson cycle with minimum thermal efficiency (pure Otto cycle), whereas B' corresponds to the point of maximum thermal efficiency (pure Atkinson cycle) for reduced load without over-expansion.

Figure 5:
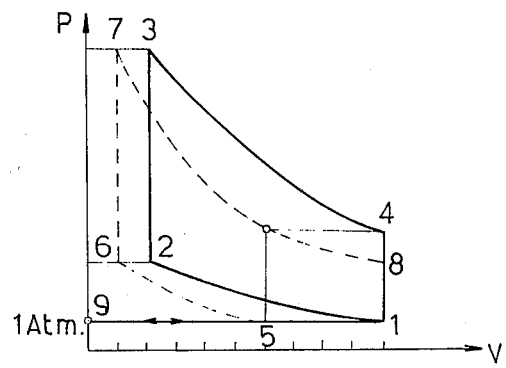
FIG. 5 is a volume-pressure diagram illustrating the operation of an "Otto-Atkinson" engine constructed in accordance with the present invention.

FIG. 5 illustrates the volume-pressure relationship to the "Otto-Atkinson" engines described below as preferred embodiments of the invention. The volume-pressure relationship in such an engine varies according to the output of the engine. When operating at maximum output, the V-P relationship is illustrated by the full line path 9'-1'-2'-3'-4'-1'-9'; and when operating at minimum engine output, this relationship is illustrated by the broken line path 9'-1'-5'-6'-7'-8'-1'-9'. The compression ratio at maximum load (V1:V2) equals the compression ratio at minimum load (V5:V6). The specific V-P relationship for any particular engine output will vary between these two limits. In the ideal case, there is a complete exhaust of the clearance gases when operating at maximum or minimum engine output (point 9, FIG. 5), this being in contrast to the original Otto and Atkinson processes (point 6, FIG. 1).

Figure 6:
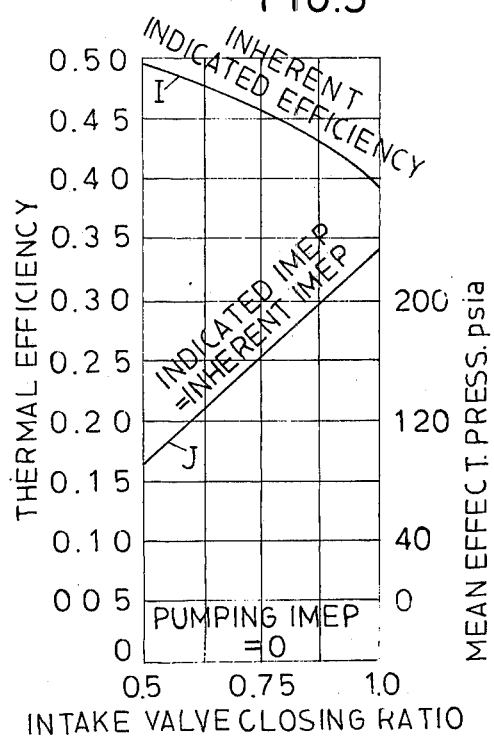
FIG. 6 illustrates how the thermal efficiency varies with variations in the intake-valve closing in the "Otto-Atkinson" engine of the present invention.

For this reason, the volumetric efficiency, and therefore the maximum load, are above the original valves for the same compression ratios, as shown in FIG. 6 relative to FIG. 4. One of the important advantages of the present invention is that the thermal efficiency increases, rather than decreases, with a reduction in engine output. Exactly how this is obtained will be described below. FIG. 6 illustrates the results obtained by preliminary computations with respect to the ideal complete exhaust case, wherein it will be seen that the indicated efficiency should increase from about 38% at maximum engine output to about 50% at 0.5 valve closing ratio (curve I), and that the indicated IMEP should decrease from about 230 psia at maximum engine output to about 90 psia at 0.5 valve closing ratio (curve J). In both cases, maximum engine output is taken, for purposes of example, at intake valve closing ratio of 1.0 (i.e. no delay), and intake valve closing ratio of 0.5 (i.e. the valve closes at the half-way point in the compression stroke) indicates minimum engine output.

As will also be explained more fully below, a further advantage of the novel engine illustrated is that in partial loads the expansion and exhaust strokes are larger than the real induction and compression strokes, thereby obtaining a more complete expansion and exhaust than provided by the conventional Otto engine.

The present invention is to be distinguished from the known late intake-valve timing technique used with throttled engines. In this known technique, the intake valve is closed appreciably after dead-bottom-centre (i.e. after the compression stroke has started) in order to attain high output at high engine speed. This technique makes use of the inertia effects of the flowing mixture to ram more charge into the cylinder at high speed by having the intake valve open very widely as the engine crank goes through bottom-dead-centre. This technique, however, does not increase the thermal efficiency of the engine when the original compression ratio remains, even for the fully-opened throttle.

FIG. 7 illustrates an engine constructed in accordance with the foregoing features.

The engine illustrated in FIG. 7 comprises a cylinder 20 having a piston, generally designated 22, movable therein through the conventional four strokes: induction, compression, expansion and exhaust. The intake valve 24 is mounted in the cylinder head having a throttleless intake manifold 25 and is controlled by a cam 28 fixed to the cam shaft 30. Valve 24 is normally urged upwardly in valve-closing position by a spring 32 interposed between the member head 26 and the intake valve head 35, and is opened by high point 28a of the cam 28 during each cycle of rotation of the cam.

The foregoing structure, insofar as described above, is more or less conventional in the conventional Otto-cycle automobile engine.

The engine illustrated in FIG. 7 differs from the conventional Otto-cycle engine mainly in the following two respects: (1) it includes a variable timing device to effect a delay in the closing of the intake valve 24 after the start of the compression stroke, this delay being increased when the engine-output control member (e.g. automobile accelerator pedal) is moved to lower the engine output, and being decreased when the engine-output control member is moved to raise the engine output; and (2) it is provided with an arrangement, namely a floating crown on the piston 22, to produce a substantially or approximately constant compression ratio operation notwithstanding variations in the valve closing delay to produce variations in the engine output.

With respect to the first of the above features, the variable timing device for delaying the closing of the intake valve 24 comprises a shiftable member or plate 34 interposed between the valve control cam 28 carried by cam shaft 30, and the head 35 of the intake valve. Shiftable plate 34 is formed with a cam surface including a flat low portion 34a and a gradually increasing higher portion 34b.

Cam plate 34 is coupled to the engine-output control member (e.g. automobile accelerator pedal) via a second shiftable member 36 movable in a slot 26' in member 26 on the cylinder head 25. One surface of member 36 is slotted at 36' and engages one end of cam plate 34, and the opposite surface is engaged by a cam 38 fixed to a shaft 40. Shaft 40 is coupled to the engine-output control member, for example the accelerator pedal of an automobile, so that it causes cam 38 to shift members 36 and 34 when the engine output is to be lowered or raised.

FIG. 7 illustrates the position of cam plate 34 to produce a maximum delay in the closing of the intake valve, and therefore a minimum engine output. It will be seen from FIG. 7 that as cam 28 rotates (in the direction of the arrow), the valve will be opened when high point 28a first engages low surface 34a, and will be closed when point 28a leaves high surface 34b.

Now when the accelerator pedal is depressed, cam 38 is rotated (in the direction of the arrow), whereby member 36 and cam plate 34 are moved rightwardly. Normally the continuous rotation of cam plate 28 against plate 34 produces sufficient force to move plate 34 rightwardly, although a spring could be provided urging the plate in this direction. The more plate 34 is moved rightwardly, the earlier in the rotational cycle of cam 28 will its high point 28a leave surface 34b, and therefore the lesser will be the delay in the closing of valve 24.

It will thus be appreciated that valve 24 is always opened at the same instant in the cycle, no matter what the position of plate 34, but its closing will depend on the position of plate 34, the arrangement being such that the more the accelerator pedal is depressed, the more rightwardly will plate 34 be moved, and therefore the earlier will be the closing of the valve. For the ideal case, the valve would be closed at zero delay for maximum power output.

With respect to the constant compression-ratio feature, this is provided by the construction of piston 22, which includes a crown 42, a skirt 44 connected to the piston connecting rod 46 by the piston pin 48, and a spring 50 connected at one end to crown 42 and at the opposite end to piston pin 48 or to the skirt 44 fixed thereto.

It will thus be seen that crown 42 floats with respect to skirt 44, connecting rod 46, and pin 48, so that the exact position of the crown within cylinder 20 at any particular instant will not only depend on the exact position of elements 44, 46, and 48, but also on the inertia force, the gas force, and the spring force (spring 50) acting on the crown at that particular instant. Disc 42' prevents over-floating of the crown.

Figure 8:
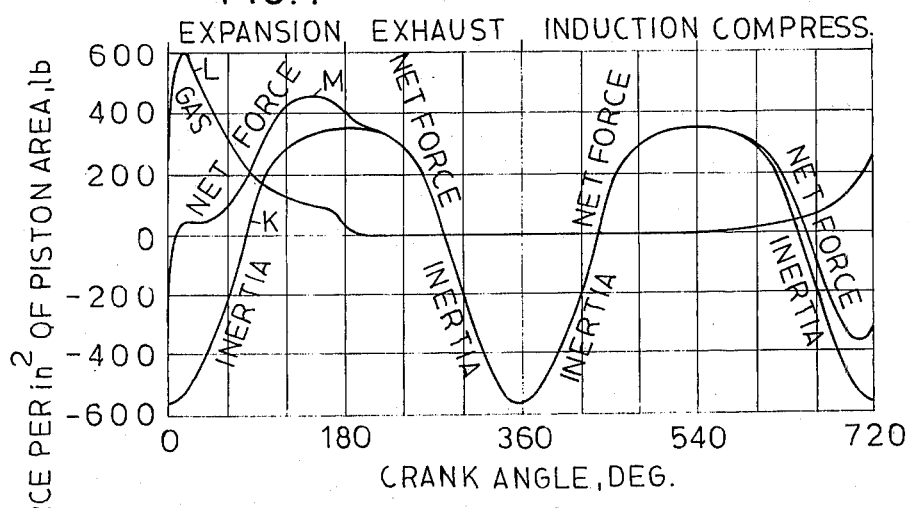

FIG. 8 is a force diagram illustrating the inertia force (curve K), the gas force (curve L), and the net force (curve M) of the latter two forces acting on the piston during the four strokes in a conventional Otto-cycle engine. In the "Otto-Atkinson" engine illustrated in FIG. 7, these same forces act on the piston crown 42, but there is the additional force of spring 50 acting on the crown.

FIG. 9 illustrates the actual displacement of the piston crown 42 during the four strokes of the engine as a result of the foregoing forces acting on it. The actual instantaneous displacement of the crown depends not only on the instantaneous point of the engine cycle, but also on the output of the engine and its rotational speed. FIG. 9 illustrates two conditions, namely the displacement when the engine is operating to produce a high or maximum output, and when the engine is operating to produce a low output, both cases with high rotational speed.

The operation of the "Otto-Atkinson" engine illustrated in FIG. 7 will now be described with particular reference to the displacement diagram of FIG. 9, and also the the force diagram of FIG. 8.

Assuming that the engine is used in an automobile, wherein the engine-output control member is the automoible accelerator pedal, this pedal would be connected to shaft 40 so as to rotate the shaft, and thereby cam 38 fixed to it, in such a direction as to move cam plate 34 rightwardly to increase the engine output.

As described earlier, FIG. 7 illustrates cam plate 34 in such position that high point 28a of cam 28 leaves cam surface 34b of cam plate 34 at the latest time so as to produce the maximum delay in the closing of intake valve 24. This produces the minimum engine output because a substantial quantity of fuel-air mixture will be force back into the intake manifold at the early part of the compression stroke when the intake valve is still open. Thus, the net quantity of charge in the cylinder at the time of combustion will be substantially decreased.

Now, when the accelerator pedal is moved to raise the engine output, it acts (via shaft 40 to which it is connected, cam 38 and member 36) to shift cam plate 34 rightwardly, whereby high point 28a leaves surface 34b of the cam plate earlier in the cycle. This causes the intake valve 24 to close earlier, thereby decreasing the delay in the closing of the valve after the start of the compression stroke. This decreases the quantity of charge forced out through the intake manifold, thereby producing a greater net quantity of fuel-air mixture inducted into the cylinder, resulting in a higher engine output.

For purposes of example, maximum engine output may be produced when there is zero delay in the closing of the intake valve (i.e. the intake valve closes substantially at bottom-dead-centre), and minimum engine output may be produced when there is a delay of one-half the compression stroke (i.e. the intake valve closes exactly midway of the compression stroke).

FIG. 9 illustrates how a substantially constant compression ratio is attained notwithstanding the variations in the engine output.

As shown in FIG. 9, during both high output operation and low output operation of the engine, the net force acting on piston crown 42 causes the crown to be against the piston skirt 34 at the end of the expansion stroke, to be displaced forwardly of the skirt at the end of the exhaust stroke, and to be against the skirt at the end of the induction stroke. However, as will be explained below, at the end of the compression stroke the crown is against the skirt to provide a large clearance 60 during high output operation, and is displaced forwardly of the skirt to provide a smaller clearance 60' under low output operation.

The crown is forwardly of the skirt at the end of the exhaust stroke because of the large inertia force (curve A, FIG. 8) and the low gas force (curve L, FIG. 8). As shown in FIG. 9, there is substantially no clearance at the end of the of the exhaust stroke, both when the engine is operating to produce a high output and a low output, because the spring and inertia forces acting on the floating crown 42 in one direction are opposed by the low gas force acting on the crown in the opposite direction.

There is, however, a clearance at the end of the compression stroke because the gas force acting on the crown is much higher than in the exhaust stroke. When the engine is operating to produce a high output more mixture will have remained in the cylinder and therefore the gas force will be higher, than when the engine is operating to produce a low output. Accordingly, the clearance at the end of the compression stroke under high output operation will be greater than the clearance at the end of the compression stroke under low output operation. This is shown in FIG. 9, by clearance 60 under high output operation being greater than clearance 60' under low output operation in any amount proportional to the net compression stroke.

Under low engine output conditions the net charge remaining in the cylinder at the start of the actual compression (when the intake closes) will be less than under high engine output conditions. Also the clearance (60') is also decreased, as described above. Accordingly a substantially constant compression ratio and substantially constant compression and combustion pressures are maintained under all engine output conditions. Thus in FIG. 5 P2 equals P6, and P3 equals P7, whereas P1, P5 and P9 are substantially atmospheric, thereby minimising pumping losses.

The basic advantages of the Ott-Atkinson engine illustrated in FIG. 7 over the conventional Otto-cycle engine will be apparent. Thus, it obviates the need of a throttle and therefore eliminates the pumping losses caused by a throttle. Also, it provides a relatively longer expansion stroke while the compression stroke is reduced, and therefore more complete expansion and combustion. Further it provides a longer exhaust stroke and therefore more complete removal of the spent gases, higher volumetric efficiency and higher maximum load. Further, special octane requirements are obviated by the floating piston crown arrangement which maintains a substantially constant compression ratio under all engine output conditions. Thus, the indicated efficiency is increased as engine output decreases.

Figure 10:
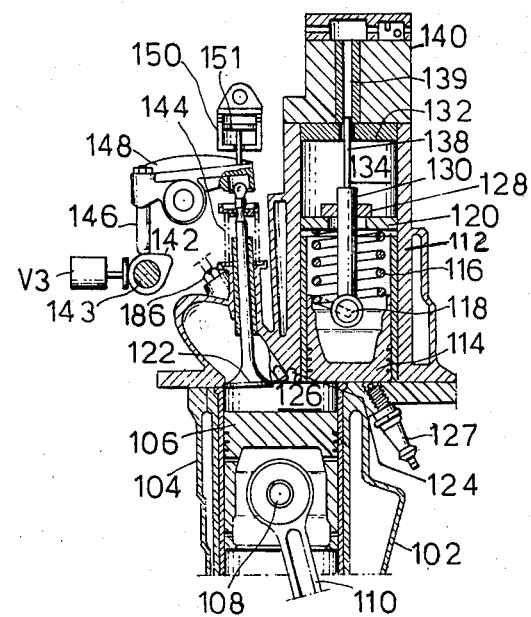
FIG. 10 is a sectional view of a portion of an engine constructed in accordance with another embodiment of the invention.
Figure 11:
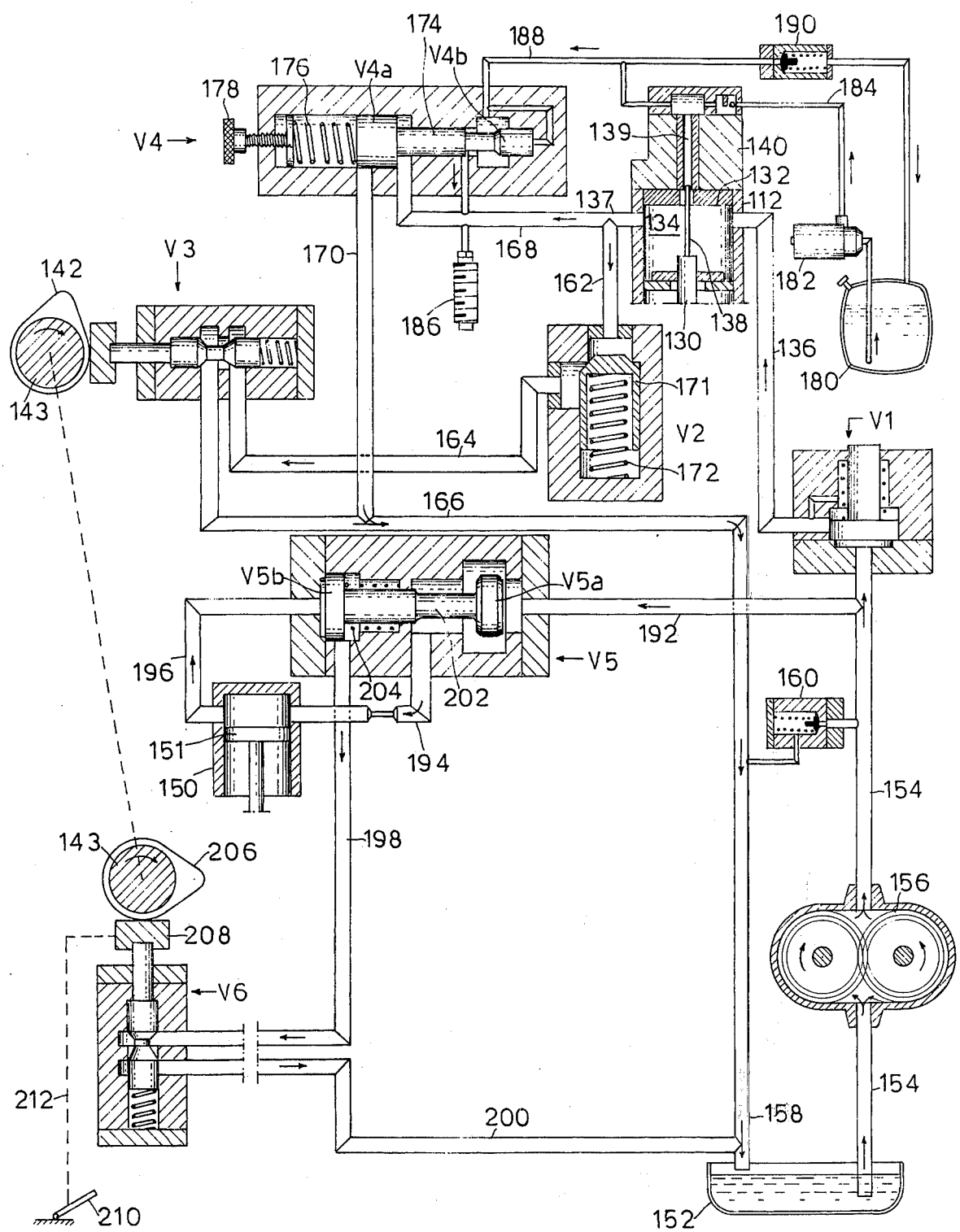
FIG. 11 is a diagram illustrating the hydraulic system in the embodiment of FIG. 10 for controlling the displacement of the auxiliary piston, the closing of the intake valve, and the fuel-injection.

FIGS. 10-11 Embodiment

FIGS. 10-11 illustrate a further embodiment of the invention.

With reference first to FIG. 10, there is shown a portion of an engine block 102 including a cylinder 104 having a piston 106, hereinafter called the main cylinder and piston respectively, the piston being coupled by pin 108 to connecting rod 110. Each main cylinder 104 is provided with an auxiliary cylinder 112 having an auxiliary piston 114 movable therein against the action of a compression spring 116 interposed between a pin 118 fixed to the piston, and a ring 120 fixed within the cylinder. The inner end of main cylinder 104 includes an opening for the intake valve 122, and a further opening 124 which communicates with the inner end of auxiliary cylinder 112. Thus, the space between the main piston 106 and its auxiliary piston 114 in their respective cylinders constitutes a common chamber 126 which is expansible and contractable by the movements of the two pistons in their respective cylinders.

Air is introduced into chamber 126 via a throttleless intake manifold (as in FIG. 7) and intake valve 122, while fuel is injected into the chamber (via the injector 186, as will be described more particularly below), and the charge is ignited by spark plug 127 disposed in the auxiliary cylinder 112 portion of chamber 126. Auxiliary piston 114 is normally biased by means of compression spring 116 in the illustrated downward position, i.e. inwardly of its cylinder, this position being determined by ring 128 fixed to stem 130 of the auxiliary piston limiting against ring 120 fixed within the auxiliary cylinder 112. The auxiliary piston, however, may be moved upwardly, i.e. outwardly of its cylinder, by the pressure within common chamber 126, this upward displacement of the auxiliary piston compressing its spring 116. Accordingly, in the illustrated normal or innermost position of the auxiliary piston, it contracts chamber 126, and when the auxiliary piston moves upwardly (i.e., outwardly with respect to its cylinder) against spring 116, it expands chamber 126.

The displacement of auxiliary piston 114 is controlled by a hydraulic fluid introduced into auxiliary cylinder 112, between auxiliary piston 114 and the outer end plate 132 of the cylinder. This space defines a hydraulic chamber 134 and is filled with a hydraulic fluid, preferably the oil of the lubricating system, which is introduced thereinto via an inlet 136 (FIG. 11) and is removed via an outlet 137.

It will be seen that during the engine compression stroke, the compressional pressure of the charge in chamber 126, caused by the displacement of the main piston 106 inwardly of its respective cylinder, displaces the auxiliary piston 114 outwardly of its cylinder to enlarge the volume of chamber 126. Thus, if the charge is increased, to produce a greater engine output, the outward displacement of the auxiliary piston will also be increased. In this manner, a substantially constant compression ratio is automatically maintained in chamber 126 between the two cylinders notwithstanding variations in the engine output.

The auxiliary piston 114 is also used for injecting fuel into the fuel chamber 126. For this purpose, stem 130 of auxiliary piston 114 is provided with a plunger 138 passing through an opening in end wall 132 of the auxiliary cylinder. Plunger 138 moves in a bore 139 formed in a fuel pump 140, and is effective to inject fuel into the cylinder. The fuel is supplied via a fuel line 184 and is pumped to the injector 186 as will be described more fully below.

The embodiment illustrated in FIGS. 10 and 11 also includes a different arrangement (i.e. different from that described in FIG. 7 above) for controlling the timing of the intake valve 122 in response to the position of the engine input-output control member (e.g. accelerator pedal), which thereby controls the quantity of the charge in the cylinder at the time of ignition. In the described example, the engine includes a fuel injector 186 and therefor the intake valve controls only the charge of air. The charge of fuel is controlled by the fuel pump which in turn is also controlled by the auxiliary piston as described below. The invention could of course also be used in a conventional engine, wherein the intake valve would control the charge of the mixture of fuel and air.

The intake valve 122 is opened in the conventional manner by a cam 142 on the engine cam shaft 143, and it is closed by a return spring 144 after the cam follower 146 engageing cam 142 leaves its high point. In the conventional engine, this occurs (i.e. the intake valve is closed) at the beginning of the engine compression stroke. In the engine of the present invention, the closing of the intake valve may be delayed for an appropriate time, after the start of the compression stroke, depending upon the required engine output. This delay in the described injector engine embodiment causes a part of the air to be expelled, and thereby reduces the quantity of the air in chamber 126 at the time of combustion. This in turn reduces the outward displacement of the auxiliary piston 114, and thereby the quantity of fuel injected by the pump 140 driven by the piston. Accordingly, the delay in the closing of the intake valve is effective to control the quantity of air and fuel charge in chamber 126 at the time of combustion, and thereby to control the power output produced by the engine.

In the embodiment illustrated in FIG. 10 and 11, the delay in the closing of the intake valve is effected by a hydraulic device 150 which has a piston 151 acting against the return spring 144 to retard the closing of the intake valve in accordance with the demanded engine output, the latter being determined by the position of the engine-output control member, e.g., the automobile accelerator pedal.

FIG. 11 illustrates the hydraulic system for controlling hydraulic chamber 134 in cylinder 112 in which the auxiliary piston 114 is displaceable to maintain a constant compression ratio in the engine, and also for controlling hydraulic device 150 to retard the closing of the intake valve 122 and thereby to control the power output produced by the engine.

The oil for the hydraulic system is supplied from a rservoir 152 via a supply line 154, an oil pump 156, and a one-way valve V1. The oil returns to the reservoir via a return line 158. A release valve 160 provides a by-pass between the supply and return lines.

The supply line 154 is connected via valve V1 to the inlet 136 of hydraulic chamber 134 in auxiliary cylinder 112. The outlet 137 from the hydraulic chamber diverges into two parallel paths: one path includes valves V2, V3 and lines 162, 164, 166 to the return line 158; and the second path includes valve V4 and lines 168, 170 to the return lines 166 and 158.

Valve V2 in the first path includes a valve member 171 urged by a spring 172 to the valve closing position against the pressure within hydraulic chamber 134 communicated to it via line 162. Spring 172 has a non-linear constant opposite to that of spring 116, in the auxiliary cylinder 112, and is provided to compensate for the non-linearity of spring 116. Accordingly, spring 172 in valve V2 acting against spring 116 within hydraulic chamber 134 assures that auxiliary piston 114 will move within its cylinder such as to provide a constant-compression-ratio during varying outputs of the engine.

Outlet line 164 from valve V2 is connected to valve V3. The latter valve is normally open but is periodically closed by cam 142 on cam shaft 143 controlling the closing of the intake valve 122, which occurs at the end of the compression stroke. Thus, the outlet from hydraulic chamber 134 is closed at the end of the compression stroke. This prevents the auxiliary cylinder 114 from being displaced upwardly within its auxiliary cylinder at that time. Accordingly, at the end of the compression stroke when ignition occurs, the auxiliary piston 114 is prevented from rising in its cylinder, so that the increase in pressure occurring in chamber 126 upon ignition displaces only the main piston 106 in the engine expansion stroke.

Valve V4, in the parallel path of lines 168, 170 between hydraulic chamber 134 and return line 158, is provided for purposes of anti-pollution control. This valve includes two valve members V4a and V4b carried by a single movable stem 174. Stem 174 is biassed by a spring 176 such that valve member V4a is normally closed and valve member V4b is normally open. The bias of spring 176 is adjusted by knob 178. Valve member V4a, in its normally closed position, blocks the flow of the hydraulic fluid from line 168 to line 170, but automatically opens when the pressure within hydraulic chamber 134 reaches a predetermined value, as preset by knob 178, to permit the auxiliary piston 114 to rise within its cylinder. When stem 174 moves valve member V4a to its open position, it moves valve member V4b to its closed position, which blocks the flow of the fuel from fuel pump 140, via line 188, to the fuel injector 186.

Thus, by adjusting knob 178, the point of opening of valve V4a may be preset so that it opens at a predetermined higher pressure than valve V2. Opening valves V4a releases the auxiliary piston 114 to rise within its cylinder 112, and therefore produces a larger volume and a lower pressure within chamber 126 for anti-pollution purposes.

Valve V4b controls the fuel injection into chamber 126 of the engine by the auxiliary piston 114. The fuel is supplied from a tank 180 via a pump 182 and a line 184 to the previously mentioned fuel pump 140 which is driven by plunger 138 carried by stem 130 of the auxiliary piston 114. When the auxiliary piston rises during the compression stroke, it pumps the fuel via line 188 to the injector 186. Accordingly, the quantity of fuel charged into chamber 126 by injector 186 depends on the displacement of the auxiliary piston 114, which occurs only during the compression stroke.

It will thus be seen that, normally, valve V3 will be closed at the end of the compression stroke in order to block the return of hydraulic chamber 134, and thereby to prevent the auxiliary piston 114 from rising in its cylinder at the end of the compression stroke. However, if the anti-pollution valve V4 is preset by suitably adjusting knob 178, so as to cause valve member V4a to move to its open position during the expansion stroke, a parallel return path for the hydraulic fluid from chamber 134 will be established, thereby permitting the auxiliary piston to rise within its cylinder to enlarge chamber 126 during the expansion stroke for anti-pollution purposes. Now when the auxiliary piston moves upwardly within its cylinder, this normally effects the injection of fuel by injector 186, but when the anti-pollution valve is actuated in the manner described above, valve member V4b will be moved to its closed position between line 188 and injector 186, and thereby to block the injection of fuel into chamber 126 during the upward movement of piston 114.

Valve 190 provides a by-pass from pump 182 to the fuel tank 180 when fuel line 188 is blocked by valve member V4b.

Oil supply line 154 supplies the oil to hydraulic device 150 which, as noted above, may be used to retard the closing of intake valve 122 by its return spring 144 during the compression stroke.

Valve V5 includes two valve members, namely member V5a between lines 192 and 194 on the input side of hydraulic device 150, and member V5b between lines 196 and 198 on the outlet side of the device. Both members are carried on a single stem 201, which is normally biassed by spring 204 such that valve member V5a is normally open and valve member V5b is normally closed. The oil is normally supplied to hydraulic device 150 via inlet line 192, valve member V5a, and inlet line 194; and it is returned from the hydraulic device via. inlet line 196, valve member V5b, a further valve V6, and line 200 connected to the return line 158.

Piston 151 of hydraulic device 150 is coupled to the intake valve 122 (FIG. 10) such that when the return spring 144 for the intake valve drives the latter to its closed position at the beginning of the compression stroke, this is retarded by the hydraulic fluid within device 150. As piston 151 of the latter device starts to move up, it moves stem 202 rightwardly, thereby moving valve member V5b to its open position with respect to return line 198, and moving valve V5a to its closed position with respect to the input line 192. Thus the rising of piston 151 of hydraulic device 150 is not influenced by the inlet pressure in line 192, this being blocked by valve member V5a, but is influenced only by the pressure within outlet line 198, and valve V6 in that outlet line.

Valve V6 is controlled by the exhaust cam 206 on cam shaft 143, such that the valve is normally closed but is opened when the cam follower 208 on valve V6 is engaged by the high point on cam 206. The outlet or return line 198 from hydraulic device 150 is thus normally closed (by valve V6), but is opened at the instant cam follower 208 is engaged by the high point of cam 206; when this occurs, the hydraulic device 150 permits the return spring 144 to close the intake valve 122.

As pointed out earlier, the instant of closing the intake valve 122 is varied by the accelerator pedal, schematically shown at 210 in FIG. 11, in order to control the output of the engine; that is to say, the more the closing of the intake valve 122 is retarded after the start of the compression stroke, the less will be the charge in the combustion chamber at the time of ignition, and the lower will be the engine power output. For this purpose, accelerator pedal 210 is coupled to valve V6, particularly to the cam follower 208 which actuates the valve when engaged by the high point on exhaust cam 206, to vary this point of engagement in accordance with the position of the accelerator pedal, and thereby to vary the amount of retardation of the closing of intake valve 122 in accordance with the required power output of the engine.

The coupling (schematically shown as broken line 212) between accelerator pedal 210 and cam follower 208 should be such as to cause a retardation in the closing of the intake valve, after the start of the compression stroke, which retardation is greater when the accelerator pedal demands a small engine output, and is less or zero when the accelerator pedal demands a large engine output.

The operation of the engine illustrated in FIGS. 10 and 11 of the drawings will now be described.

At the start of the induction stroke, piston 106 in the main cylinder 104 moves outwardly of its cylinder, and intake valve 122 is opened by cam 142 whereupon air is inducted into the main cylinder 126. The opening of intake valve 122 loads return spring 144; it also causes piston 151 of hydraulic device 150 to move downwardly within its cylinder, the latter being thereupon filled with oil via lines 192, 194 and valve member V5a.

When the induction stroke ends and the compression stroke begins, cam 142 will have moved such as normally to permit intake valve 122 to be closed by its return spring 144. However, this closing of the intake valve will be retarded by hydraulic device 150, since its return path, defined by lines 198, 200, is closed by valve V5. The amount of retardation of the closing of intake valve 122 after the start of the compression stroke is determined by the point of opening of its return line 198 by valve V6, the latter valve being opened when its cam follower 208 engages exhaust cam 206 on the cam shaft.

As pointed out earlier, when accelerator pedal 210 is in position demanding a small engine output, the coupling 212 between the accelerator pedal and cam follower 208 moves the cam follower circumferentially with respect to cam 206 so as to provide a large delay in the opening of valve V6 after the start of the compression stroke, and thereby a large delay in the closing of the intake valve 122 after the start of the compression stroke, and when the accelerator pedal is in position demanding a large engine output, a small or zero delay is produced in the opening of valve V6 and thereby in the closing of the intake valve 122.

Accordingly, if a small engine output is demanded, a large delay will be produced in the closing of the intake valve, and therefore a part of the charge inducted into the main cylinder 104 during the induction stroke will be forced out of the main cylinder before the intake valve 122 is closed.

In addition, since the auxiliary piston 114 will move up at a later time within its cylinder 112, it will pump a smaller quantity of fuel to injector 186. Accordingly, the fuel charge present in the main cylinder at the time of ignition will be reduced when a smaller engine output is demanded.

On the other hand, if a large engine output is demanded by the accelerator pedal, cam follower 208 will be positioned so as to decrease or altogether cancel the retardation of the closing of the intake 122 after the start of the compression, thereby producing the required larger charge.

During the compression stroke, the main piston 106 is moved inwardly of its cylinder 104, thereby increasing the pressure within chamber 126. This increase in pressure causes auxiliary piston 114 to rise, i.e., to move outwardly of its cylinder in the direction to expand chamber 126. This movement of auxiliary piston 114 is opposed by compression spring 116, which is loaded thereby.

The outward movement of auxiliary piston 114 is also opposed by the oil within hydraulic chamber 134 filled with oil supplied from inlet 136 and one-way valve V1. The outlet line 137 includes valve V2 which, when opened against its spring 172, permits the oil in chamber 134 to return via line 164, valve V3, and line 166. Spring 172 corrects for the non-linearity of return spring 116 acting on the auxiliary piston 114 to produce a substantially constant compression ratio during varying engine-output conditions. Valve V3 is normally open, being closed only at the end of the compression stroke by cam 142, so that it prevents the upward displacement of the auxiliary piston at the end of the compresssion stroke even though valve V2 is open at that time.

Thus, a substantially constant compression ratio is maintained within chamber 126 defined by the main piston 106 and auxiliary piston 114 and their respective cylinders, notwithstanding variations in the engine output.

At the end of the compression stroke, valve V3 is closed by cam 142, thereby closing the return line from hydraulic cylinder 134. Accordingly, the auxiliary piston is prevented from rising in its cylinder during high chamber pressure, so that during the expansion strokes, only the main piston 106 is free to move outwardly of its cylinder.

If non-pollution control is desired, knob 178 if valve V4 may be preset so as to open the return line from hydraulic cylinder 134, via lines 168, 170, at a predetermined pressure following the ignition of the fuel. Accordingly, when the non-pollution valves V4 is appropriately preset, the greater pressure produced in chamber 126 following the ignition of the fuel will cause valve member V4a to open, thereby opening the return line of hydraulic chamber 134, and permitting the auxiliary piston 114 to rise further within its cylinder. Accordingly, the volume of chamber 126 will be enlarged, which reduces pollution.

As described earlier, auxiliary piston 114 is also used for injecting the fuel during the compression stroke as it rises in its auxiliary cylinder 112. During the compression stroke, stem 174 of the anti-pollution valve V4 is in the illustrated position wherein its valve member V4b opens the fuel line 188 to injector 186, so that the upward movement of the auxiliary piston 114 causes its plunger 138 to pump fuel from tank 180 into line 188. However, if the anti-pollution valve V4 is actuated during the expansion stroke following ignition, in the manner described above, stem 174 which moves valve member V4a to open the outlet line from hydraulic cylinder 134 permitting the auxiliary piston to rise, also moves valve member V4b to close the path from fuel line 188 to injector 186. Thus, the fuel is blocked from being injected into the cylinder during the expansion stroke following ignition.

When the expansion stroke of the engine has been completed, cam 142 opens valve V3 which valve remains open until the start of the next compression stroke.

During the subsequent exhaust stroke, the auxiliary piston 116 is not displaced outwardly of its cylinder since there is no great build-up of pressure within common chamber 126.

Many variations will be apparent, both with respect to the manner of delaying the closing of the intake valve 122 in order to reduce the charge in chamber 126 at the time of combustion, to thereby vary the engine output, and also in the manner for maintaining a substantially constant compression ratio in chamber 126 notwithstanding variations in the engine output.

FIGS. 12-16 EMBODIMENTS

Figure 12:
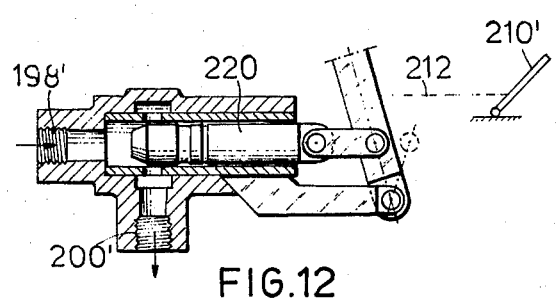
FIG. 12 illustrates a variation in the control for closing the intake valve.

FIG. 12 illustrates one variation that may be used for delaying the closing of the intake valve. In this variation, the outlet line 198 (FIG. 11) from hydraulic device 150 is opened, not by cam-actuated valve V6, but rather by a metering pin 220 between outlet line 198' and drain line 200', the position of the metering pin being controlled by the accelerator pedal 210'. Thus, the coupling between accelerator pedal 210' and metering pin 220 which coupling is schematically shown by the broken line 212 in FIG. 12, will be such to withdraw the metering pin from the connection between lines 198' and 200' when a larger output is demanded by the accelerator pedal from the engine, thereby decreasing the retardation of the closing of the intake valve 122 after the start of the compression stroke, and thereby producing a larger engine output. On the other hand, if the engine output is to be decreased, the coupling 212 from the accelerator pedal 210' to metering pin 220 should be such as to decrease the rate of oil flow fron line 198' to line 200', thereby increasing the retardation of the closing of the valve and reducing the power output.

FIGS. 13-16 illustrate various alternative arrangements which may be used, in lieu of the hydraulic system, for providing a substantially constant compression ratio in the common chamber. The arrangement of these figures could be used with any desired arrangement for retarding the closing of the intake valve, such as those described earlier.

Figure 13:
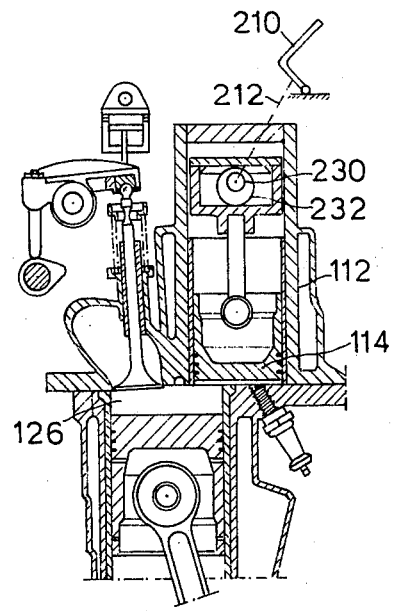
FIGS. 13–16 illustrates a number of variations that may be used instead of the hydraulic system for controlling the displacement of the auxiliary piston in order to maintain a substantially constant compression-ratio during varying outputs of the engine.

FIG. 13 illustrates an arrangement wherein the accelerator pedal 210 is coupled to a cam shaft 230 carrying a cam 232 which, when the cam shaft is rotated, displaces the auxiliary piston 114 inwardly or outwardly of its auxiliary chamber 112, in order to vary the volume of the common chamber 126, and thereby to maintain a substantially constant compression ratio therein. The coupling between accelerator pedal 210 and cam shaft 230 will be such that when a higher engine output is demanded by the accelerator pedal, the auxiliary piston 114 would be raised, i.e. moved outwardly in its cylinder 112, to increase the volume of the common chamber 126; and when a lower engine output is demanded, the auxiliary piston would be lowered or moved inwardly of its cylinder to decrease the volume of the chamber 126. Accordingly, a substantially constant compression ratio is maintained within chamber 126 notwithstanding variations in the engine output demanded by the accelerator pedal.

The FIG. 13 arrangement would not provide complete exhaust since the auxiliary piston 114 does not return to its normal position during the exhaust stroke. This disadvantage is avoided by the arrangement illustrated in FIG. 14, wherein the same cam 232 carried by cam shaft 230 coupled to accelerator pedal 210 are provided, except that there the auxiliary piston 114 is urged to its innermost position within its cylinder by means of a compression spring 234. Spring 234 should have a low spring constant, so that the auxiliary piston 114 may rise to its highest point, as determined by the position of cam 232, before the end of the compression stroke, and thereby to reduce the impact against the cam.

Figure 14:
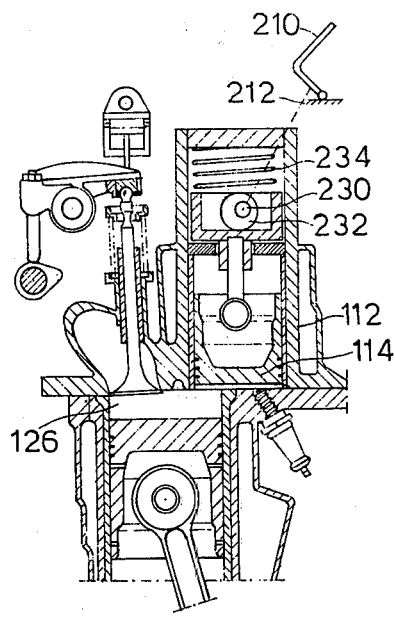

It will thus be seen that in the arrangement of FIG. 13, the auxiliary piston 114 moves with cam 232 which is in turn moved by the accelerator pedal; whereas in the FIG. 14 arrangement, the cam 232 merely fixes the highest position of the auxiliary piston, the latter being moved by the compressional pressure within chamber 126 against the action of spring 234. Accordingly, as this compressional pressure is reduced during the exhaust stroke, spring 234 will return the auxiliary piston to its innermost position, thereby effecting a more complete exhaust than the FIG. 13 arrangement. A more complete exhaust results in a greater fuel-air-mixture being inducted into the combustion chamber under maximum loads than the conventional Otto Engine.

Figure 15:
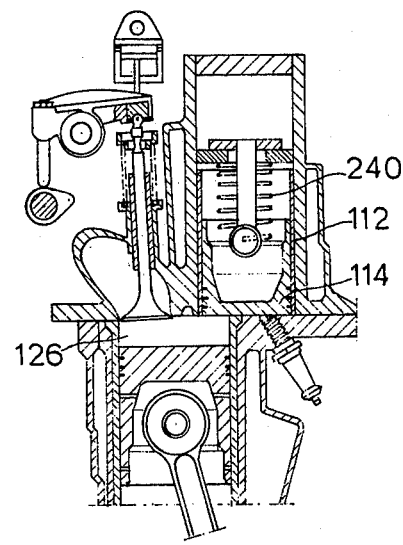
Figure 16:
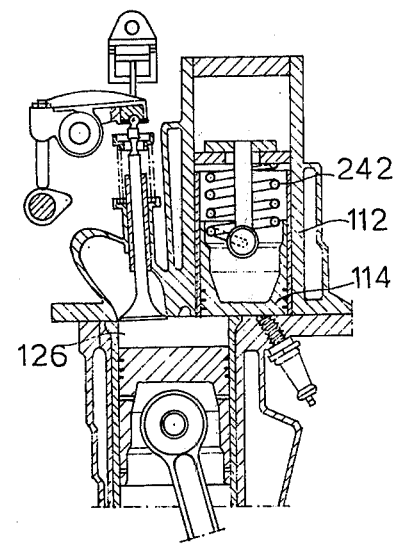

The arrangement illustrated in FIGS. 15 and 16 are similar to each other, and to that of FIGS. 10 and 11, except that instead of using a hydraulic system for controlling the upward displacement of the auxiliary piston, the return spring (116 in FIG. 10) for returning the auxiliary piston is used for this purpose. This spring is shown at 240 in FIG. 15, wherein it is illustrated as a non-linear spring, in the sense that the counterforce increases with the displacement of the auxiliary piston 114.

Thus, the auxiliary piston will also be displaced upwardly, (i.e. outwardly of its cylinder 112) after the expansion stroke, which will have an anti-pollution effect, but also a lower efficiency. In addition, this arrangement will probably also facilitate detonation even though lower octane fuel is used. This arrangement can therefore be characterized as a "limited pressure combustion" arrangement.

FIG. 16 illustrates a similar arrangement as in FIG. 15, but here a linear return spring 242 is used instead of the non-linear return spring 240 of FIG. 15. This arrangement will produce a greater displacement of the auxiliary piston 114 after ignition, and therefore may be termed a "constant-pressure combustion" arrangement.

FIGS. 17–18 EMBODIMENT

Figure 17:
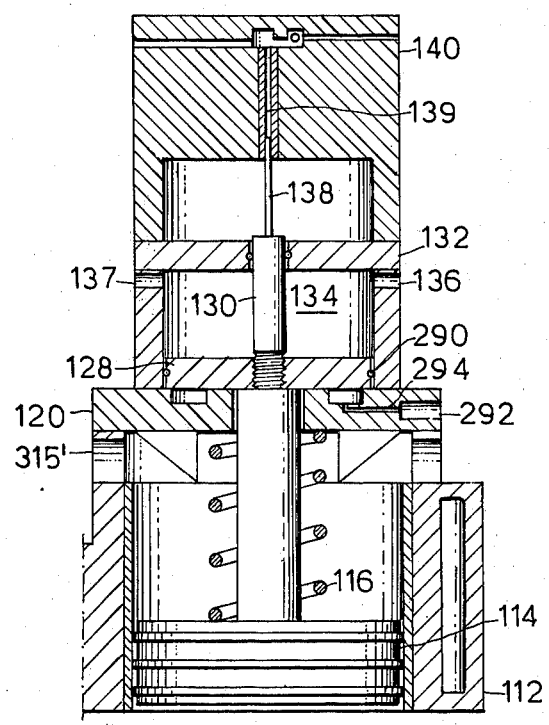
FIG. 17 is a sectional view of a further embodiment, including the auxiliary piston and cylinder illustrated in FIG. 10 but incorporating an improved hydraulic-assist arrangement for augmenting the raising of the auxiliary piston.
Figure 18:
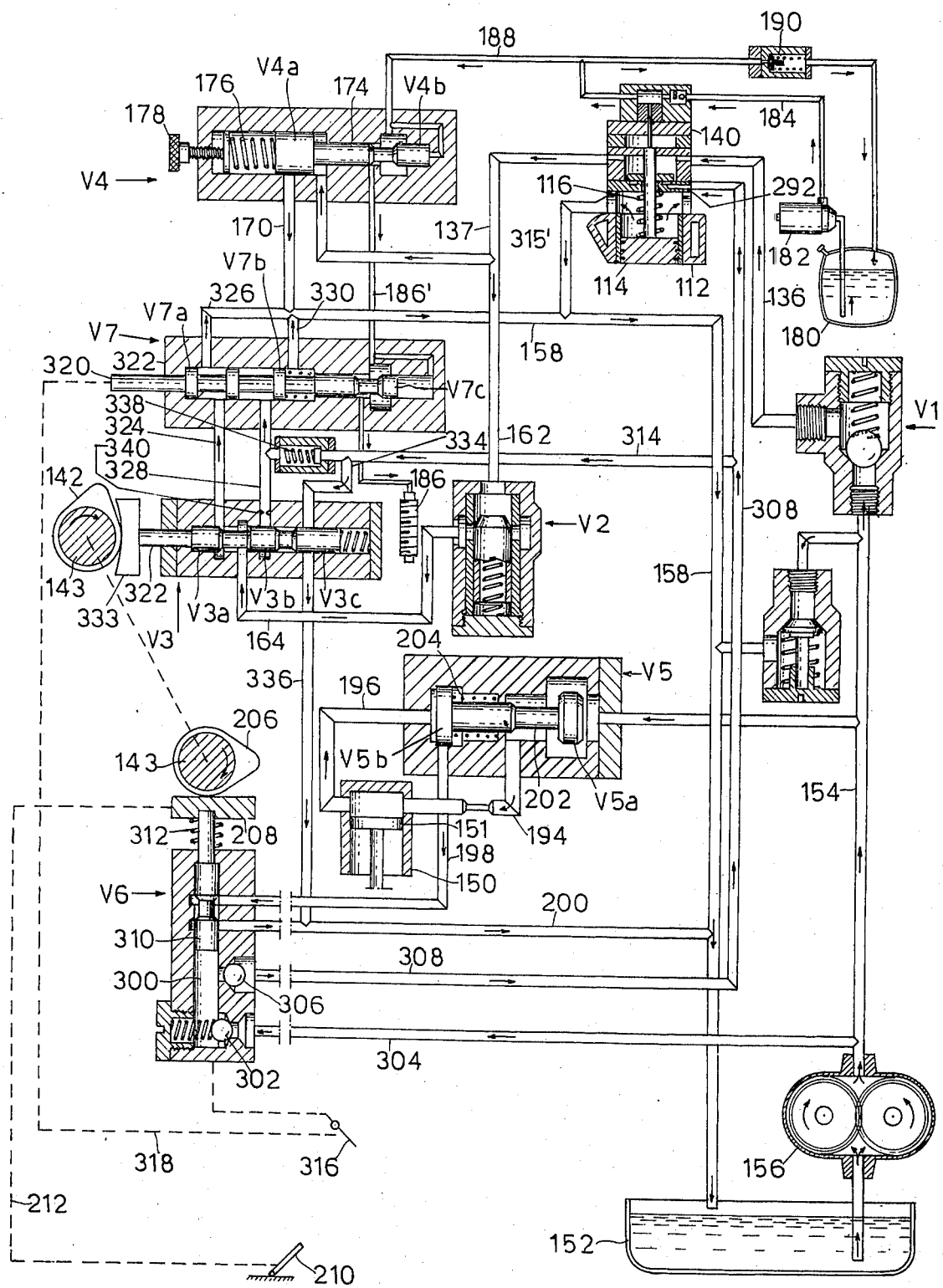
FIG. 18 is a diagram illustrating the hydraulic system of FIG. 11 but including the improvement of FIG. 17 for controlling the displacement of the auxiliary piston, the closing of the intake valve, and the fuel-injection.

The embodiment of the invention illustrated in FIGS. 17 and 18 is basically similar to that of FIG. 10. In order to facilitate understood of the improvements in FIGS. 17 and 18, the elements which are basically the same as in FIG. 10 are identified by the same reference numerals, and the new elements involved in the improvements of FIGS. 17 and 18 are identified by reference numerals beginning with "290".

With reference first to FIG. 17 illustrating the auxiliary cylinder 112 and the auxiliary piston 114, it will be seen that the ring 120 closing one end of the auxiliary cylinder, and through which stem 130 of the auxiliary piston 114 projects, is provided on its upper surface with an annular channel 290 which is open at the top and which forms a chamber with the underface of ring 128 fixed to stem 130 of the auxiliary piston 114. Chamber 290 is connected to an oil port 292 by means of a passageway 294. As will be described below, presurized oil is fed via port 292 to chamber 290 and augments the raising of the auxiliary piston by the presurized mixture in the common chamber during the compression stroke. When the auxiliary piston returns to its innermost position by means of return spring 116, the oil within chamber 290 is returned to the hydraulic system via port 292, although a small quantity of the oil may pass between ring 120 and piston stem 130 to lubricate the piston and cylinder.

The remaining structure of the auxiliary piston and cylinder illustrated in FIG. 17 is basically the same as in FIG. 10, and their parts are correspondingly numbered.

The hydraulic system illustrated in FIG. 18 is also very similar to that of FIG. 10, with similar parts being correspondingly numbered. The following is a description of the new elements in FIG. 18.

The oil in the hydraulic system supplied from reservoir 152, line 154 and pump 156, is also supplied to a newly-provided pump driven by the exhaust cam 206 on cam shaft 143.

It will be recalled that cam 206 cooperates with cam follower 208 which is coupled to the accelerator pedal 210 to vary the degree of retardation of the closing of the intake valve in accordance with output power required of the engine, this being effected by valve V6 being opened when follower 208 is engaged by the high point of cam 206 to open the drain of hydraulic device 150 and thereby to permit the intake valve (122) to be closed by its return spring (144).

In the modified arrangement illustrated in FIG. 18, valve V6 is provided with an internal chamber 300 connected by a non-return valve 302 to an oil inlet line 304 joined to the main supply line 154, and the outlet of chamber 300 is connected by a non-return valve 306 to an outlet line 308 leading to port 292 (FIG. 17) communicating with the above-described chamber 290 in the auxiliary cylinder 112. Cam follower 208, which is actuated by cam 206 to open valve V6 at the proper time, also carries a plunger 310 movable within chamber 300. Cam follower 208, and thereby plunger 310, are both urged to their upper positions by means of a spring 312, but are lowered during each rotation of the cam shaft 143 when the high point of cam 206 engages cam follower 208.

The arrangement is such that the high point of cam 206 disengages from cam follower 208 during the last part of the compression stroke, thereby permitting the cam follower to rise under the influence of spring 312; this causes plunger 310 to rise within chamber 300, which is thus filled with oil supplied from inlet pipe 304. At the start of the next compression stroke when cam follower 208 is depressed by cam 206 (according to the position of the cam follower in response to the displacement of the acceleration pedal 210 as described in the basic system), plunger 310 is lowered into chamber 300 thus forcing oil via one-way valve 306, line 308, and auxiliary cylinder port 292, to oil chamber 290 within the auxiliary cylinder, thereby augmenting the lifting of the auxiliary piston 114 during the compression stroke.

The auxiliary piston is normally returned to its lowered position at the end of the expansion stroke by means of its return spring 116 and pressurized oil in chamber 134. The oil within chamber 290 being mostly returned through line 308 and line 314. The path from the latter line to the drain line 158 is more particularly described below. Some of the oil, as mentioned above, seeps between the ring 120 to lubricate and cool the auxiliary piston 114 and cylinder 112. This oil is returned to the drain line 158 via line 315 connected to part 315' formed in the auxiliary cylinder 112.

The provision of the pump (plunger 310 movable within chamber 300 for augmenting the lifting of the auxiliary piston 114 within the auxiliary clinder 112 has been found to improve the dynamic performance of the engine particularly at high speed. As will be more particularly described below, the degree of augmentation being increased with increasing loads.

The present invention also provides an arrangement for braking-control of the engine. This control is shown in the hydraulic system diagram of FIG. 18'.

The automobile brake pedal 316 is mechanically coupled, as shown by broken lines 318, to a valve device V7 which includes a single stem 320 carrying three valve members V7a, V7b and V7c within a housing 322. Stem 320 is normally in its left position as illustrated in FIG. 18, but is displaced rightwardly whenever brake pedal 316 is actuated. When the automobile is braked and valve stem 320 is moved rightwardly, valve member V7a closes line 324 from line 326, valve member V7b opens line 328 to line 330, and valve member V7c closes fuel line 186' to the fuel injector 186.

As will be described more particularly below, the closing of line 324 from line 326 by valve member V7a during braking prevents the oil in chamber 134 of the auxiliary piston from rising during the compression stroke; the opening of line 328 to line 330 by valve member V7b during braking permits the oil to drain from auxiliary chamber 134, and thereby the auxiliary piston to rise, during the expansion stroke (which it cannot do under non-braking conditions); the closing of fuel line 186' to injector 186 by valve member V7c blocks the supply of fuel to the injector during braking.

As described above valve V3 is closed at the end of the compression stroke in order to block the drain of the oil from hydraulic chamber 134, and thereby the rising of the auxiliary piston 114 in its cylinder 112, at the end of the compression stroke, however, when the braking control of the present invention is included in the hydraulic system, the auxiliary piston is permitted to rise in its cylinder at the end of the compression stroke and during the expansion stroke under braking conditions. This dissipates the energy stored in the common chamber and thereby provides for more efficient braking.

For the foregoing purpose, valve V3 is provided with three valve members V3a, V3b and V3c all fixed to the same stem 332 so as to be actuated by the intake valve cam 142 on the engine cam shaft 143. In this case, however, the cam follower 333 is provided with a concave, or inwardly-dished, surface engageable with cam 142 so that the high-point of cam 142 will engage the cam follower for a longer period of time, such that stem 332 is moved to its actuated or rightward position at the end of the compression stroke and stays there through the expansion stroke.

The three valve members V3a, V3b and V3c of valve V3c operate as follows:

Valve member V3a is open for most of the cycle, but closes at the end of the compression stroke and stays closed through the expansion stroke. During non-braking conditions, valve member V3a prevents the rising of the auxiliary piston 114 after the end of the compression stroke; it does this by closing line 164 from line 324 and thereby prevents the draining of chamber 134 in the auxiliary cylinder. During braking conditions, the drain path from line 324 to line 326 is closed by valve member V7a, which prevents the auxiliary piston to rise during the compression stroke.

Valve member V3b, when actuated at the end of the compression stroke opens line 164 to line 328. During non-braking conditions, line 328 is closed from drain line 330 via valve member V7b; but during braking conditions, it is opened to the drain line to permit the drain of chamber 134 and thereby the rise of the auxiliary piston 114 during the last part of the compression stroke and the expansion stroke.

Valve member V3c controls the path including lines 334 and 336 to line 200 and to the drain 158.

Valve V3c is opened in each cycle only during the expansion stroke. When closed it closes lines 314 and 334 from the drain line 336, 200 and 158 so that the oil pumped by plunger 310 will flow via line 308 to chamber 290 of the auxiliary cylinder to augment the lift of the auxiliary piston: but at the end of the compression stroke and for the complete expansion stroke, valve member V3c is opened, thereby opening the drain lines 158 and 200 to line 314, cutting off the lift augmentation of the auxiliary piston. Valve member V3c also provides a path for draining the oil from chamber 290 during the expansion stroke under non-braking conditions.

Upon braking during the compression stroke when valve member V3c is closed, the oil flows from line 308 and 314 via a non-return-valve 338 and valve member V7b to drain lines 330 and 158, thereby preventing the lift-augmentation; and during the expansion stroke when valve member V3c is open, the oil flows also from line 314 to drain lines 336, 200 and 158.

Non-return valve 338 is provided to prevent the flow of oil from line 164 through the path including lines 328, 334, valve member V3c and line 336 to drain 158, during the expansion stroke when valve members V3c and V3b are open, during both braking and non-braking conditions.

The system illustrated in FIGS. 17 and 18 will now be described, first with respect to a non-braking operation, and then with respect to a braking operation.

Under non-braking conditions, the system operates substantially the same as described above in FIGS. 10–11, except that the rise of the auxiliary piston 114 during the compression stroke is augmented by the oil supplied to auxiliary piston chamber 290 via line 308 from the pump driven by cam 206. Thus, when the high point on cam 206 engages cam follower 208 during the compression stroke, plunger 310 is depressed into chamber 300, forcing the oil within that chamber through non-return valve 306, line 308, and port 292 into the auxiliary piston chamber 290. The pressurized oil applies a force, cumulative with the force applied by the compressed mixture within the common chamber, to raise the auxiliary piston 114 in order to maintain a substantially constant compression ratio in the common chamber. As pointed out earlier, this hydraulic assist in the raising of the auxiliary piston improved the dynamic performance of the engine particularly at high speeds.

As also briefly mentioned earlier, the hydraulic assist provided by plunger 310 movable within chamber 300 varies in accordance with the engine load, such that less assist is provided with a lower engine load. This will be apparent from the description of the basic system, wherein it was pointed out that depressing accelerator pedal 210 increases the engine power output by varying the position of cam follower 208 with respect to cam 206, such that the greater the depression of the accelerator pedal, the smaller will be the delay in the opening of line 198 to line 200 for draining the hydraulic device 150, and therefore the smaller will be the delay in the closing of the intake valve and the greater will be the charge in the common chamber at the time of combustion. As also described, under non-braking conditions the auxiliary piston is blocked from rising at the end of the compression stroke by valve V3 (member V3a in the modification of FIG. 18). At the beginning of the expansion stroke the surplus oil (the lower the load, the greater the surplus oil) from line 308 flows through line 314, line 334, valve V3c and line 336 to the drain line 158, it being recalled that valve V3c is opened exactly at the end of the compression stroke and stays open through the complete expansion stroke.

Accordingly, it will be seen that plunger 310 forces the same quantity of oil through line 308 under both high-load and low-load conditions. However, as the load decreases, the delay in the closing of the intake valve increases. This also delays the start of the pumping of the oil through line 308, and thereby the rising of the auxiliary piston 114 in its auxiliary chamber. Under normal (non-braking) conditions, the auxiliary piston is prevented from rising at the start of the expansion stroke, by drawing the surplus oil via valve member V3c, and preventing the oil from drawing from chamber 134 via valve member V3a. The longer the pumping of the oil from chamber 300 to the auxiliary piston is delayed after the start of the compression stroke (in low loads), the smaller will be the hydraulic assist provided by such oil, and the greater will be the quantity of oil that will flow directly to line 314 without flowing to chamber 290.

In other words, a lower engine output demanded by the accelerator pedal 210 produces a greater delay in the depression of plunger 310 within chamber 300, and a lower hydraulic assist to the lifting of the auxiliary piston 114.

Under non-braking conditions, the auxiliary piston is prevented from rising at the end of the compression stroke by valve V3a blocking the drain of chamber 134, at which time the oil from line 308 is prevented from passing into auxiliary piston chamber 290, and therefore passes through line 314, and valve V3c to the drain, since valve V3c is opened exactly at the end of the compression stroke and stays open through the expansion stroke.

Now, when the engine is to be braked, brake pedal 316 is depressed, which causes stem 320 of valve device V7 to be moved rightwardly, producing the following results:

First, valve member V7a is moved rightwardly to close line 324 from line 326. This prevents the oil from draining from auxiliary cylinder chamber 134, and thereby prevents the auxiliary piston 114 from rising during the compression stroke. Accordingly, the pressure within the common chamber will increase the energy being derived from the main piston.

Fuel is prevented from being injected into injector 186 by the movement of valve member V7c rightwardly during braking, to close positively fuel line 186' from injector 186.

The movement of valve member V7b during braking conditions opens line 328 to line 330. Thus, during the expansion stroke when valve member V3b is in its open condition as described earlier, the auxiliary piston chamber 134 will be permitted to drain via lines 137 and 162, valve V2, line 164, valve V3b, line 328, valve member V7b, and line 330 to the drain line 158. The auxiliary piston 114 will thus be permitted to rise during the expansion stroke, and therefore will absorb some of the energy invested into the common chamber by the main piston during the compression stroke.

The energy absorbed by the auxiliary piston during braking is transferred to the oil in hydraulic chamber 134 which is forced through line 137 and the previously-described path including valve members V3b and V7b. To inhance the dissipation of this energy, line 328 on the output side of valve member V3b may be provided with an orifice 340 restricting the flow of the oil and thereby converting some of its energy into heat.

It will be appreciated that the smaller the delay in the retardation of the closing of the intake valve by cam 206 engaging cam follower 208, the greater will be the braking effect upon braking the engine as described above. During non-braking conditions, depressing the accelerator pedal 210 decreases the retardation in the closing of the intake valve. Accordingly, the valve V7 may be linked to, or built as part of, the accelerator pedal 210 such that when the operator is normally driving with his foot depressing the accelerator pedal, and suddenly wishes to brake the automobile, he need merely shift the accelerator pedal sidewise, for example, without lifting his foot from it, so that the so-depressed accelerator pedal now acts as the brake pedal and is effective by actuating valve V7 to brake the automobile with a braking force corresponding to the amount of depression of the pedal. Such an arrangement, which is purely optional, would significantly reduce the reaction time in braking the automobile.

Many other changes, variations and applications of the illustrated embodiments will be apparent.

What is claimed is:

1. An internal combustion engine operable through induction, compression, expansion and exhaust strokes, comprising: a main cylinder and a main piston movable therein; an auxillary cylinder and an auxillary piston movable therein; the inner ends of the two cylinder being in communication with each other and defining a common chamber with their respective pistons; means including a fuel intake valve for effecting the induction of gases into said common chamber; a control member movable to control the engine output; a variable valve timing device controlling the timing of the intake valve; a coupling between said movable control member and the variable valve timing device effecting a delay in the closing of the intake valve in response to the movement of the control member, which delay is increased when the control member is moved to lower the engine output and decreased when the control member is moved to raise the engine output; said auxillary piston being floatingly displaceable in its auxillary cylinder to increase or decrease the volume of the common chamber; a spring urging the auxillary piston to its innermost position within the auxillary cylinder; and limiting means controlled by said control member and acting on said auxillary piston independently of said spring for limiting the outermost position of the auxillary piston within its auxillary cylinder to increase or decrease the volume of said common chamber in accordance with the engine output so as to provide a substantially constant compression ratio and substantially complete exhaust during all loads.

2. An internal combustion engine according to claim 1 wherein the engine includes a throttleless intake manifold so that there is substantially atmospheric pressure within the cylinders during the time the intake valve is open, and during the exhaust stroke, thereby minimising pumping losses.

3. An engine according to claim 1 wherein said limiting means comprises a hydraulic system controlling the displacement of the auxiliary piston towards the outer end of its auxiliary cylinder.

4. An engine according to claim 3, wherein said hydraulic system comprises a hydraulic chamber, a fluid inlet line connected to the inlet of the hydraulic chamber, a fluid outlet line connected to the outlet of the hydraulic chamber, and hydraulic fluid control means controlling the flow of the hydraulic fluid through said outlet line.

5. An engine according to claim 4, wherein said hydraulic fluid control means comprises a pressure-responsive valve in the hydraulic fluid outlet line, which valve is biassed towards its closed position by a second spring having a spring constant compensating for the non-linearity of said first spring.

6. An engine according to claim 5, wherein said hydraulic fluid control means further comprises a cam-actuated valve in the outlet line in series which the pressure-responsive valve and effective to close the hydraulic fluid outlet line at the end of the engine compression stroke, to prevent the auxiliary piston from moving outwardly in its cylinder after termination of the engine compression stroke.

7. An engine according to claim 6, wherein said hydraulic fluid control means further comprises a second pressure-responsive valve for anti-pollution purposes shunting both said first-mentioned pressure-responsive valve and said cam-actuated valve, said second pressure-responsive valve being normally closed and including presettable spring means enabling the valve to open upon the presence of a high predetermined pressure in said hydraulic chamber to permit the auxiliary piston to move further outwardly in its cylinder.

8. An engine according to claim 7, further including a fuel injector pump and a coupling from same to the auxiliary piston such that the outward displacement of the auxiliary piston during the compression stroke effects the injection of fuel into the respective common chamber.

9. An engine according to claim 8, wherein said second pressure-responsive valve includes a fuel control valve member blocking the injection of fuel by the further outward movement of the auxiliary piston upon the opening of said second pressure-responsive valve.

10. An engine according to claim 1, wherein said limiting means comprises a cam coupled to the engine-output control member for controlling the displacement of the auxiliary piston outwardly in its auxiliary cylinder to maintain the substantially constant compression ratio notwithstanding variations in the engine output.

11. An engine according to claim 1, further including a fuel injector pump and a connection from same to the auxiliary piston such that the outward displacement of the auxiliary piston during the compression stroke effects the injection of fuel into the respective common chamber.

12. An internal combustion engine according to claim 1, wherein the fuel intake valve is opened by a cam on the cam shaft and is closed by a return spring, said variable timing device comprising a hydraulic device acting against the return spring for retarding the closing of the intake valve in accordance with the movement of the engine-output control member.

13. An engine according to claim 12, wherein said hydraulic device comprises: a cylinder; a piston movable therein and defining a hydraulic chamber within the cylinder; said hydraulic chamber having an inlet connected to a fluid inlet line and an outlet connected to a fluid outlet line; said piston being coupled to the intake valve such that the fluid within the hydraulic chamber, when the fluid outlet line is closed, prevents the displacement of the piston by the return spring and thereby the closing of the intake valve; and an outlet-line opening device coupled to the engine-output control member to time the opening of the outlet line in accordance with the position of the latter control member, and thereby the closing of the intake valve by the return spring.

14. An engine according to claim 13, wherein said outlet line opening device comprises a valve in the outlet line, a cam follower cooperable with a cam on the engine cam shaft for opening said latter valve, and a coupling between the engine-output control member and said cam follower for varying the position of the cam follower with respect to said cam to vary the timing of opening the latter valve during the compression stroke in accordance with the position of the engine-output control member.

15. An engine according to claim 13, wherein said outlet line opening device comprises a metering device in the outlet line for metering the rate of flow of the hydraulic fluid there-through, said metering device being coupled to the engine-output control member to vary the rate of flow of the hydraulic fluid through the outlet line in accordance with the position of the engine-output control member.

16. An internal combustion engine according to claim 1, further including hydraulic means for augmenting the displacement of the auxiliary piston during the compression stroke.

17. An engine according to claim 16, wherein said hydraulic means is controlled by the engine-output control member to provide a higher degree of augmentation during high engine loads than during low engine loads.

18. An engine according to claim 17, wherein said hydraulic means comprises an oil pump driven by a cam on the engine cam shaft, said cam driving a follower whose position with respect to the cam is varied by the engine-out-put control member.

19. An internal combustion engine according to claim 1, wherein the engine further includes a brake control system which, when actuated, prevents the rise of the auxiliary piston during the compression stroke, and enables its rise during the expansion stroke.

20. An engine according to claim 19, wherein said brake control system comprises a plurality of valves in the hydraulic system, said valves being coupled to a common stem actuated by the brake pedal when depresses.

* * * * *